US008805688B2

(12) United States Patent
Barton et al.

(10) Patent No.: US 8,805,688 B2
(45) Date of Patent: *Aug. 12, 2014

(54) COMMUNICATIONS USING DIFFERENT MODALITIES

(75) Inventors: William F. Barton, Harvard, MA (US); Francisco M. Galanes, Wellesley, MA (US); Lawrence M. Ockene, Seattle, WA (US); Anand Ramakrishna, Redmond, WA (US); Tal Saraf, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 123 days.

This patent is subject to a terminal disclaimer.

(21) Appl. No.: 13/412,413

(22) Filed: Mar. 5, 2012

(65) Prior Publication Data

US 2012/0170722 A1 Jul. 5, 2012

Related U.S. Application Data

(63) Continuation of application No. 11/695,826, filed on Apr. 3, 2007, now Pat. No. 8,131,556.

(51) Int. Cl.
*G10L 21/00* (2006.01)
*G10L 15/26* (2006.01)
*G10L 13/08* (2006.01)
*H04M 1/64* (2006.01)

(52) U.S. Cl.
USPC ...... 704/270.1; 704/235; 704/260; 379/88.01

(58) Field of Classification Search
USPC ................. 704/235, 260, 270, 270.1
See application file for complete search history.

(56) References Cited

U.S. PATENT DOCUMENTS

| 5,329,578 | A | 7/1994 | Brennan et al. |
| 5,724,410 | A | 3/1998 | Parvulescu et al. |
| 5,815,566 | A | 9/1998 | Ramot et al. |
| 5,930,700 | A | 7/1999 | Pepper et al. |
| 5,946,386 | A | 8/1999 | Rogers et al. |
| 6,219,638 | B1 | 4/2001 | Padmanabhan et al. |

(Continued)

FOREIGN PATENT DOCUMENTS

WO    WO 01/67241 A1    9/2001

OTHER PUBLICATIONS

Baset, S.A. et al., "An Analysis of the Skype Peer-to-Peer Internet Telephony Protocol", http://www1.cs.columbia.edu/~salman/publications/skype_I_4.pdf, 11 pages.
Wu, W. et al., "Integration of SIP VoIP and Messaging with the AccessGrid and H.323 Systems", http://grids.ucs.indiana.edu/ptliupages/publications/sip-webservices-short02.pdf, 10 pages.

(Continued)

*Primary Examiner* — Angela A Armstrong
(74) *Attorney, Agent, or Firm* — Steven Spellman; Jim Ross; Micky Minhas

(57) ABSTRACT

Communications between users of different modalities are enabled by a single integrated platform that allows both the input of voice (from a telephone, for example) to be realized as text (such as an interactive text message) and allows the input of text (from the interactive text messaging application, for example) to be realized as voice (on the telephone). Real-time communication may be enabled between any permutation of any number of text devices (desktop, PDA, mobile telephone) and voice devices (mobile telephone, regular telephone, etc.). A call to a text device user may be initiated by a voice device user or vice versa.

20 Claims, 6 Drawing Sheets

(56) References Cited

U.S. PATENT DOCUMENTS

| | | |
|---|---|---|
| 6,477,551 B1 | 11/2002 | Johnson et al. |
| 6,618,704 B2 | 9/2003 | Kanevsky et al. |
| 6,625,258 B1 | 9/2003 | Ram et al. |
| 6,687,339 B2 | 2/2004 | Martin |
| 6,757,362 B1 | 6/2004 | Cooper et al. |
| 6,804,332 B1 | 10/2004 | Miner et al. |
| 6,964,023 B2 | 11/2005 | Maes et al. |
| 6,965,920 B2 | 11/2005 | Pedersen |
| 6,996,076 B1 | 2/2006 | Forbes et al. |
| 7,058,036 B1 | 6/2006 | Yu et al. |
| 7,058,578 B2 | 6/2006 | Michelson et al. |
| 7,065,185 B1 | 6/2006 | Koch |
| 7,103,548 B2 | 9/2006 | Squibbs et al. |
| 7,110,748 B2 | 9/2006 | Murphy et al. |
| 7,136,458 B1 | 11/2006 | Zellner et al. |
| 7,136,475 B1 | 11/2006 | Rogers et al. |
| 7,142,846 B1 | 11/2006 | Henderson |
| 7,197,646 B2 | 3/2007 | Fritz et al. |
| 7,315,613 B2 | 1/2008 | Kleindienst et al. |
| 7,333,507 B2 | 2/2008 | Bravin et al. |
| 7,463,723 B2 | 12/2008 | Davis et al. |
| 7,551,574 B1 | 6/2009 | Peden et al. |
| 7,552,467 B2 | 6/2009 | Lindsay |
| 7,640,006 B2 | 12/2009 | Portman et al. |
| 7,770,209 B2 | 8/2010 | Billingsley et al. |
| 7,974,608 B2 | 7/2011 | Chin et al. |
| 8,000,276 B2 | 8/2011 | Scherzer et al. |
| 8,131,556 B2 * | 3/2012 | Barton et al. .............. 704/270.1 |
| 2001/0036821 A1 | 11/2001 | Gainsboro et al. |
| 2002/0067803 A1 | 6/2002 | Antonucci et al. |
| 2002/0094067 A1 | 7/2002 | August |
| 2002/0136206 A1 | 9/2002 | Gallant et al. |
| 2003/0064709 A1 | 4/2003 | Gailey et al. |
| 2003/0135569 A1 | 7/2003 | Khakoo et al. |
| 2003/0147518 A1 | 8/2003 | Albal et al. |
| 2004/0003041 A1 | 1/2004 | Moore et al. |
| 2004/0019487 A1 | 1/2004 | Kleindienst et al. |
| 2004/0198327 A1 | 10/2004 | Bates et al. |
| 2004/0202117 A1 | 10/2004 | Wilson et al. |
| 2004/0240642 A1 | 12/2004 | Crandell et al. |
| 2004/0267527 A1 | 12/2004 | Creamer et al. |
| 2004/0267531 A1 | 12/2004 | Whynot et al. |
| 2005/0021344 A1 | 1/2005 | Davis et al. |
| 2005/0065802 A1 | 3/2005 | Rui et al. |
| 2005/0141691 A1 | 6/2005 | Wengrovitz |
| 2005/0144291 A1 | 6/2005 | Frank et al. |
| 2005/0227678 A1 | 10/2005 | Agrawal et al. |
| 2006/0010200 A1 | 1/2006 | Mousseau et al. |
| 2006/0041622 A1 | 2/2006 | Qutub et al. |
| 2006/0052127 A1 | 3/2006 | Wolter |
| 2006/0072718 A1 | 4/2006 | Satzke et al. |
| 2006/0095578 A1 | 5/2006 | Paya et al. |
| 2006/0098583 A1 | 5/2006 | Baker et al. |
| 2006/0112163 A1 | 5/2006 | Enatsu et al. |
| 2006/0112165 A9 | 5/2006 | Tomkow et al. |
| 2006/0182029 A1 | 8/2006 | Kealy et al. |
| 2006/0182236 A1 | 8/2006 | Kapoor |
| 2006/0218624 A1 | 9/2006 | Ravikumar et al. |
| 2006/0239429 A1 | 10/2006 | Koch et al. |
| 2006/0256816 A1 | 11/2006 | Yarlagadda et al. |
| 2006/0270391 A1 | 11/2006 | Kim et al. |
| 2007/0022481 A1 | 1/2007 | Goldman et al. |
| 2007/0026372 A1 | 2/2007 | Huelsbergen |
| 2007/0033258 A1 | 2/2007 | Vasilaky et al. |
| 2007/0092073 A1 | 4/2007 | Olshansky et al. |
| 2007/0165821 A1 | 7/2007 | Altberg et al. |
| 2007/0286395 A1 | 12/2007 | Mandalia et al. |
| 2008/0037746 A1 | 2/2008 | Dufrene et al. |
| 2008/0075261 A1 | 3/2008 | Ramanathan et al. |
| 2008/0089499 A1 | 4/2008 | Hahn et al. |
| 2008/0102957 A1 | 5/2008 | Burman et al. |
| 2008/0127302 A1 | 5/2008 | Qvarfordt et al. |
| 2008/0134323 A1 | 6/2008 | Pinkas et al. |
| 2008/0184346 A1 | 7/2008 | Pinkas et al. |
| 2008/0189768 A1 | 8/2008 | Callahan et al. |
| 2008/0208589 A1 | 8/2008 | Cross et al. |
| 2008/0235353 A1 | 9/2008 | Cheever et al. |
| 2008/0247529 A1 | 10/2008 | Barton et al. |
| 2008/0247530 A1 | 10/2008 | Barton et al. |
| 2009/0073965 A1 | 3/2009 | Dowling et al. |
| 2009/0083826 A1 | 3/2009 | Baribault |
| 2009/0214007 A1 | 8/2009 | Van Wyk et al. |
| 2009/0262668 A1 | 10/2009 | Hemar et al. |
| 2010/0077082 A1 | 3/2010 | Hession et al. |

OTHER PUBLICATIONS

Google Talk, "What is Google Talk?", http://www.google.com/talk/about.html, ©2006, 3 pages.

Ju, Y-C. et al., "Call Analysis with Classification Using Speech and Non-Speech Features", Interspeech, ICSLP, 2006, http://research.microsoft.com/srg/papers, 1902-1905.

Sarkar Das, S. et al., "Application of Automatic Speech Recognition in Call Classification", IEEE, 2002, http://ieeexplore.ieee.org, 3896-3899.

Shi, H. et al., "Telephony Applications using Microsoft Speech Server", IJCSNS International Journal of Computer Science and Network Security, Aug. 2006, 6(8A), http://eprints.vu.edu.au/archive, 75-78.

Microsoft Office Communications Server 2007, Fact Sheet, Aug. 2006, http://download.rnicrosoft.com/download, 2 pages.

U.S. Appl. No. 11/732,629: Non-final office action dated Jun. 23, 2011, 5 pages.

U.S. Appl. No. 11/732,629: Final office action dated Dec. 8, 2011, 6 pages.

U.S. Appl. No. 11/732,629: Non-final office action dated Aug. 1, 2013, 5 pages.

"Captcha: Telling Humans and Computers Apart Automatically" Published Jun. 21, 2007 as verified by the Internet Archive (3 pages) http://replay.waybackmachine.org/20070621111739/http://www.captcha.net/.

Wikipedia article for "Captcha" as published on Sep. 16, 2006. (4 pages) http://en.wikipedia.org/w/index.php?title=CAPTCHA&oldid=76044483.

Rick Broida. Alpha Geek: Keep spam off your cell phone. http://lifehacker.com/software/spam/alpha-geek-keep- spam-off-your-cell-phone215700.php. Last accessed Feb. 13, 2007.

Jeff King, et al. KHAP: Using Keyed Hard AI Problems to Secure Human Interfaces. http://www-static.cc.gatech. edu/-peff/wseg-2004-king-paper.pdf. Last accessed on Feb. 13,2007.

Ion Androutsopoulos. et al. A Game Theoretic Model of Spam E-Mailing. http://www.aueb.gr/Users/ion/docs/ ceas2005_paper.pdf. Last accessed on Feb. 13, 2007.

U.S. Appl. No. 11/859,274: Final office action dated Mar. 7, 2013, 10 pages.

U.S. Appl. No. 11/859,274: Non-final office action dated Sep. 14, 2012, 10 pages.

U.S. Appl. No. 11/859,274: Final office action dated Mar. 5, 2012, 10 pages.

U.S. Appl. No. 11/859,274: Non-final office action dated Oct. 14, 2011, 10 pages.

U.S. Appl. No. 11/859,274: Final office action dated Apr. 29, 2011, 11 pages.

U.S. Appl. No. 11/859,274: Non-final office action dated Nov. 15, 2010, 10 pages.

Amyot, D. et al., "Description of Wireless Intelligent Network Services with Use Case Maps", http://cserg0.site.uottawa.ca/ftp/pub/Lotos/Papers/sbrc99.pdf, 16 pages.

"Lucent Technologies Introduces Personal Assistant Technology for the Broad Consumer and Business Markets", http://www.lucent.com/press/0199/990127.nsc.htrnl, 3 pages.

Metropark-Your Total Communication Partner, "Speech Recognition Executive Assistant Solution", http://www.metropark.com/brochure/voice/brightarrow.pdf, 4 pages.

U.S. Appl. No. 11/695,810: Non-final office action dated Oct. 18, 2010, 12 pages.

* cited by examiner

COMMUNICATIONS USING DIFFERENT MODALITIES

CROSS REFERENCE TO RELATED APPLICATIONS

This application is a continuation of U.S. patent application Ser. No. 11/695,826 filed on Apr. 3, 2007, the entire contents are incorporated herein by reference.

BACKGROUND

Telephony encompasses the general use of equipment to provide voice communication over a distance. Plain old telephone service, or POTS, is the most basic form of residential and small business telephone service. POTS became available soon after the telephone system was introduced in the late 19th century and, from the standpoint of the user, has existed more or less unchanged ever since. POTS services include bi-directional or full duplex voice path with a limited frequency range, a dial tone and ringing signal, subscriber dialing, operator services such as directory assistance, and long distance and conference calling. During the 1970s and 1980s, new network services became available due to the creation of electronic telephone exchanges and computerization. New services included voice mail, caller identification, call waiting, reminder calls and other similar services.

Advances in digital electronics have revolutionized telephony by providing alternate means of voice communication than those provided by traditional (analog) telephone systems. IP Telephony is a form of telephony which uses the TCP/IP protocol popularized by the Internet to transmit digitized voice data. The routing of voice conversations over the Internet or through other IP networks is also called VoIP (Voice over Internet Protocol). Digital telephony was introduced to improve voice services, but was subsequently found to be very useful in the creation of new network services because it can transfer data quickly over telephone lines. Computer Telephony Integration (CTI) enables a computer to control phone functions such as making and receiving voice, fax, and data calls. The Session Initiation Protocol (SIP) is a signaling protocol used for creating, modifying and terminating sessions (voice or video calls) with one or more participants. Sessions include Internet telephone calls, multimedia distribution and multimedia conferences. Development of the SIP protocol was motivated by the need for a signaling and call setup protocol for IP-based communications that could support the call processing functions and features present in the public switched telephone network (PSTN) using proxy servers and user agents.

Interactive text messaging is a form of real-time communication between two or more people based on typed text. Interactive text messaging differs from email in that text conversations are conducted in real-time using computers connected over a network such as the Internet. A client program on a text messaging user's computer connects to an interactive text messaging service. The user types a message and the service sends the text message to the recipient. Popular interactive text messaging services on the Internet include .NET Messenger Service, AOL Instant Messenger, Excite/Pal, Gadu-Gadu, Google Talk, iChat, ICQ, Jabber, Qnext, QQ, Meetro, Skype, Trillian, Yahoo! Messenger and Rediff Bol Instant Messenger.

All the advances in telephony and interactive text messaging, however, have not solved some very basic problems associated with actually reaching a desired party. Communication in real-time is currently impossible between people who have access only to devices of different modalities. For example, when one user only has access to an ordinary (voice-only) telephone and another only has access to a (text only) Instant Messaging client, there is no way for the two users to communicate in real-time. The below addresses these and other problems.

SUMMARY

Communications between users of different modalities is enabled by a single integrated platform that allows both the input of voice (from a telephone, for example) to be realized as text (as an interactive text message) and allows the input of text (from the interactive text messaging application) to be realized as voice (on the telephone). Real-time communication may be enabled between any permutation of any number of text devices (desktop, PDA, mobile telephone) and voice devices (mobile telephone, regular telephone, etc.). A call to a text device user may be initiated by a voice device user or vice versa.

DETAILED DESCRIPTION OF ILLUSTRATIVE EMBODIMENTS

Overview

Figure 1:
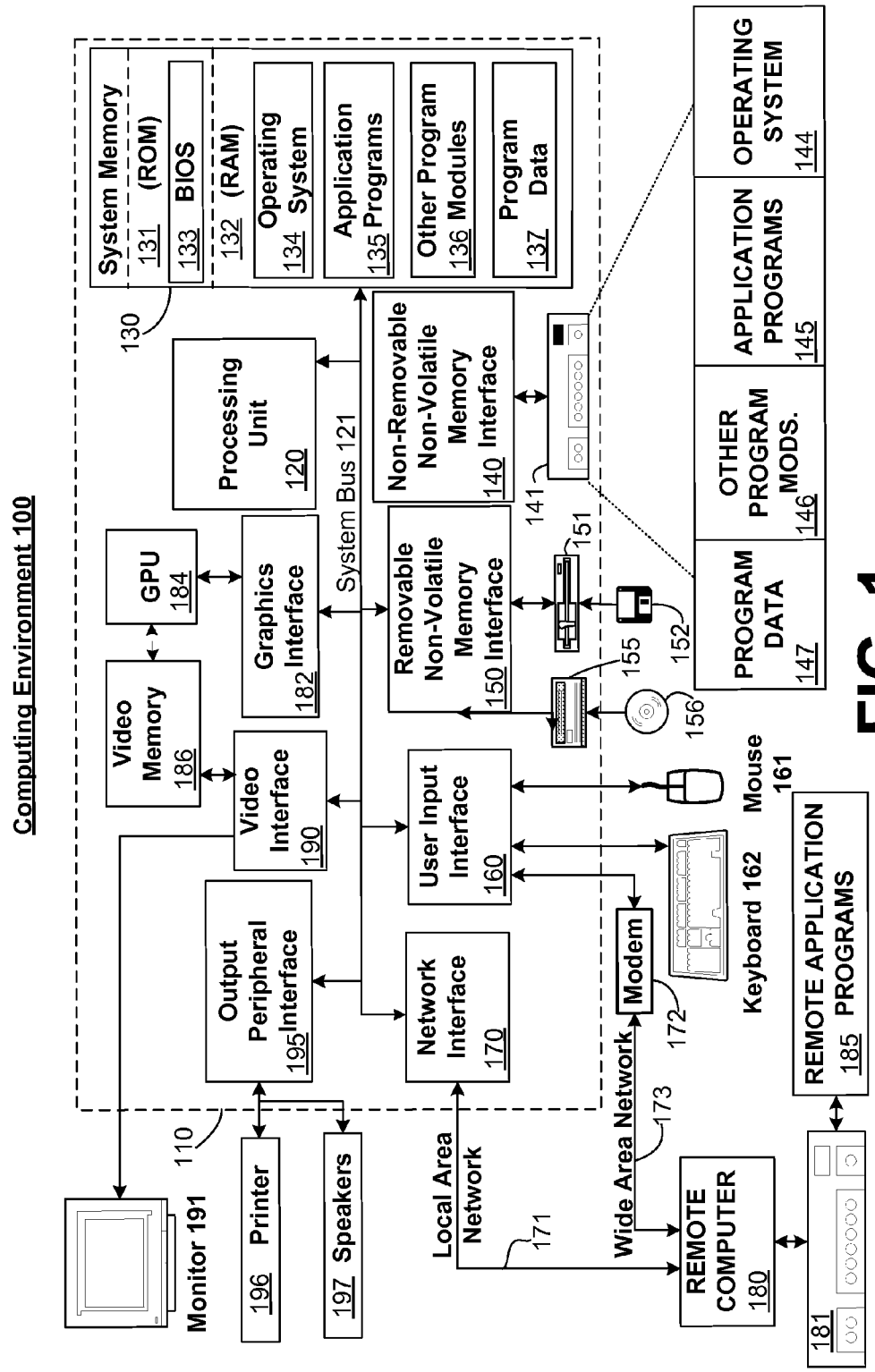
FIG. 1 is a block diagram illustrating an exemplary computing environment in which aspects of the invention may be implemented.

Currently, communication in real-time is impossible between people who only have access to devices of different modalities. One example is when one user only has a voice-only telephone and the other user only has access to an interactive text messaging service, (as frequently occurs, for example, when the interactive text messaging service user is in a meeting and a telephone user tries to call him). A VoIM Gateway ("Voice over IM") is a platform which enables real-time communication between users of different modalities. The platform allows both the input of voice (from the telephone) to be realized as text (in the interactive text messaging client) and the input of text (from the text messaging client) to be realized as voice (on the telephone). While described in terms of an interactive text messaging application such as IM, other forms of text messaging utilizing SMS (e.g., to cellular telephones), HTML, email, etc. are contemplated. Any permutation of text devices (desktop, PDA, mobile telephone having text capabilities, etc.) and voice devices (mobile telephone, standard telephone, etc.) may be used. Embodiments of the invention may permit multiple-user scenarios (i.e., more than two users), different originating devices, different speech recognition grammars and aspects of Voice User Interface (VUI) (interacting with a computer through a voice/speech platform in order to initiate an automated service or process), multimedia devices (e.g., streaming video with audio converted into text). Calls may be originated either from the voice-only client (e.g., a telephone user contacts an IM user) or from the text-only client (e.g., the interactive text messaging client user originates a call to a voice-only user). A single VoIM gateway converts input from one modality into another (from voice to text and from text to voice). Grammars and language models for the speech recognition component may be optimized for an interactive text messaging or other real-time text input interaction.

With respect to calls originated from a voice-only client, a robust voice user interface, (called herein the Personal Virtual Assistant or PVA) may be hosted on an enterprise communications server operating in real time. The communications server may integrate with a number of known corporate telephone systems but can process any type of voice channel. The PVA can provide the following services: caller identification, mixed-initiative multimodal call screening and negotiation, personalized call routing, structured message-taking, cross-modal messaging, voice dialing and voice-enabled message access and configuration. The PVA can communicate with the caller, classify the call and handle the disposition of the incoming call.

When a caller dials a callee's telephone number using a voice-only device, (and the callee is a PVA user) in some embodiments of the invention, the PVA application answers the caller's call and prompts the caller to identify himself/herself. An automated speech recognition component is used to process the caller's voice input. The caller may be asked the relative importance of the call, and other information such as the subject of the call and so on. An indication that the callee's PVA is trying to reach the callee may be sent to the callee. In some embodiments of the invention, the indication is sent in the form of a "toast", a small notification window that pops-up on the screen, typically although not necessarily in the lower right side of the desktop. The toast indicates an incoming email, or that a member of a contacts list is available. The toast remains on the screen briefly and spontaneously disappears. The indication may include one or more of the following: the name of the caller, the relative importance of the call, the subject of the call or other information. In response to instructions received from direct interaction of the PVA with the callee or to default instructions stored in a rules database (generic or caller-specific), the PVA may forward the call to a specific voice-capable destination, generate a structured voicemail, send a text alert to a suitable PVA user client, establish a dialog including a (potentially) cross-modal dialog between a voice-only caller and a text-only PVA user client, or transfer the call to another user. The PVA may support dialing from desktop and remote phones.

For example, in a greeting phase of call negotiation, a call may be answered, and the PVA may issue a user-configurable greeting, perhaps giving the caller an indication that the caller is interacting with an automated system (e.g., "Hi, this is Bill's Virtual Assistant, please speak clearly."). In the next phase of call negotiation, the caller may be identified. The PVA may interact with the caller to identify the caller either as a recognized member of the callee's Contacts list or as someone who is not recognized, that is, who is not a member of the callee's Contacts list. An initial guess may be derived from the call's ANI (Automatic Number Identification is a feature of telephony intelligent network services which permits subscribers to display or capture the telephone numbers of calling parties), however, the ANI is often not available, not recognized (i.e., not in the Contacts list), ambiguous (associated with multiple contacts), or misleading (e.g., the caller is using a telephone belonging to someone else). The PVA can prompt the caller to identify himself/herself and confirm the elicited or ANI-derived identity, enabling caller-specific handling logic to be performed, instead of caller-independent handling logic, which is the norm today.

Before alerting the callee to the call, the PVA may ask the caller to provide information which enables the PVA to characterize the call (phase three of call negotiation). For example, a caller from a specific contact group (e.g., contact group is Family, Supervisor, or Customer, etc.) may be able to provide information so that the call is handled in a particular way by the PVA. (For example, a member of a Family or Supervisor contact group may be extended the opportunity to say the call is urgent to facilitate special call handling.) In the fourth phase of call negotiation, the PVA may play an announcement that was specified by the PVA user (the callee, in this example) to the caller such as "Let me see if Bill is at his desk" and may use a combination of caller identity, caller characterization, callee presence and configured rules to attempt to alert the callee to the call and to obtain the callee's instructions for handling the call. For example, if the callee's presence indicates that the callee is at his/her desk, the callee's desktop phone may ring, and a desktop alert such as a popup on the callee's computer can present the incoming call information with application call-handling choices (e.g., "Bill, Larry is calling and says it is urgent. Should I: 1) Take a message 2) Take a message and say you will call back in [N] minutes 3) Transfer call to [Cellular Telephone]"). The callee has the option to pick up the desktop telephone to take the call directly or can communicate with the PVA via the popup or other channels. If the callee is not at his desk but can be contacted by alternate means, such as by an interactive text channel such as Instant Messenger (IM) or the like, a similar alert and list of options can be sent via the interactive text channel, through which the election may be made. If the callee is already on the desktop telephone but is not online (i.e., not able to receive a desktop alert), the callee can respond to a call-waiting ring by pressing a key which causes the PVA to play an audible message that includes the call information, so that the callee can indicate how the call should be handled before returning to the original call (i.e., the call the callee was taking when he received the call-waiting ring). In each of these cases, the PVA may wait for the callee election, (with a suitable timeout period after which the PVA continues without callee election), before proceeding to the next phase of call negotiation. The next phase of call negotiation is caller election.

In the caller election phase, the PVA may present a list of call handling options to the caller. The list may include one or more options. If there is only one available option, the PVA may inform the caller before proceeding without waiting for caller input (e.g., "Bill cannot take any calls right now, but he would like you to leave a message, and he will call you back in 30 minutes." and proceed to the voicemail prompt, or alternatively, the PVA may merely proceed. If there are two or more choices, the PVA may prompt the caller to select one of the choices, (e.g., "Bill is away from his desk. Would you like me to forward your call to his cell, take a message and send him an alert, or set up an interactive text session with him?"). If one of the callee-specified ways to handle the call is to transfer the call, the PVA may include the name of the destination user if there is only one specified on the transfer list (" . . . or be transferred to [name]") or, if there are multiple destination users specified on the transfer list, the PVA may give a generic prompt such as " . . . or be transferred to someone who can help you.") The destination user may be a PVA user or may alternatively, be someone who is not a PVA user. The degree of access offered to the caller may reflect static rules in place for that particular caller and/or may depend on caller-specific instructions provided by the alerted callee to the PVA. Default rules may stipulate that leaving a message is always an option.

In some embodiments of the invention, the PVA may learn from interactions with callers. For example if a caller has elected to use cross modal communications for the past [N] times (may be specifyable by the PVA user) when calling a callee, this mode of communication may become the default for that caller-callee pair. Other alternatives may be removed unless the PVA user (or one of the PVA users in the case that both the caller and the callee are PVA users) elects to change the mode of communication for the caller/callee pair.

Call handling includes call forwarding, saving a structured voicemail and sending an alert, instantiating an instant (cross-modal) voice messenger session with the callee and call transfer. Voice-only calls may be forwarded to voice-capable destinations such as to the callee's mobile telephone or other communications device. A text alert providing "envelope" information (information about when the call was received) may be delivered to one or more of the callee's available text-mode clients. The caller may be guided through the process of leaving a structured voicemail, so that voicemail-waiting alerts are able to provide more information to the callee. In addition to the identity and call characterization described above, the caller may be prompted for the general topic of the call (e.g., "What is this regarding?") and the best time and means for the callee to reply. The PVA may also prompt the caller to record a free-format body of the message. The structured information may be included in any text-mode or voicemail-waiting alert which the PVA sends to the callee, facilitating timely and efficient message retrieval.

A cross-modal "instant voice messenger" conversation may be mediated by the PVA between a voice-only caller and a text-only callee (the callee is a PVA user). The PVA may prompt the caller to dictate a message, which may then be converted to text using a large vocabulary recognizer that has been tuned to an interactive text-messaging service such as Instant Messenger. The text of the caller's message may be sent to the callee's interactive text-messaging service (e.g., to an IM client) and the callee's reply may be played back to the caller using the PVA's text-to-speech (TTS) engine. Thus the callee is able to "chat" using an interactive text messaging service with a voice-only caller in situations where it would be disruptive or otherwise undesirable to accept a voice call and engage in an audible conversation.

Call transfer provides preferential call handling for priority calls when the callee is unable to take the call directly or does not want a caller to leave a message (perhaps because the callee will be out of touch for an extended period of time). The PVA may be configured to provide the caller with a list of alternative callees to whom the caller may be directed. The original callee may have recorded an explanatory prompt ("I will be out of the office until May 15th. For questions about release schedules, ask for Ray; for questions about features, ask for Chris . . . How may I direct your call?"

Voice-enabled message retrieval may include a robust interface for voice-only message retrieval including multi-modal support. A PVA user may call the PVA using an SIP telephone or communications device and use spoken queries to get sorted and filtered lists of message summaries delivered to the user's device. A user interface on the device may permit rapid viewing and selection and can play back the selected message in voice mode.

The PVA may provide voice dialing and conferencing support, from both the desktop telephone and from remote dial-in, voice-enabling call-related functions accessible from the desktop telephone keypad or a desktop Communicator client.

The callee may have full access to his contact list. The PVA may support voice commands such as "Call Larry", "Call Larry in his office", "Call Larry on his cellular telephone and conference in Tal" and "Keep trying Larry". For the latter case, the PVA may call the callee back when Larry answers the call. While in a call, the PVA user may access relevant voice commands such as transfer, conferencing, etc. by pressing a key on the device.

With respect to a call originated from the interactive text messaging user to a voice only user, a user logged into an interactive text messaging client may send a text message via a network such as the Internet to the VoIM gateway. The VoIM gateway may convert the text message to a voice message and may select an appropriate pathway (VoIP Gateway or VoIP Telephone) depending on the recipient device. If the VoIP gateway is chosen, the VoIP gateway may forward the message to a PSTN telephone.

Exemplary Computing Environment

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Cross-Modal Communication

Figure 2A:
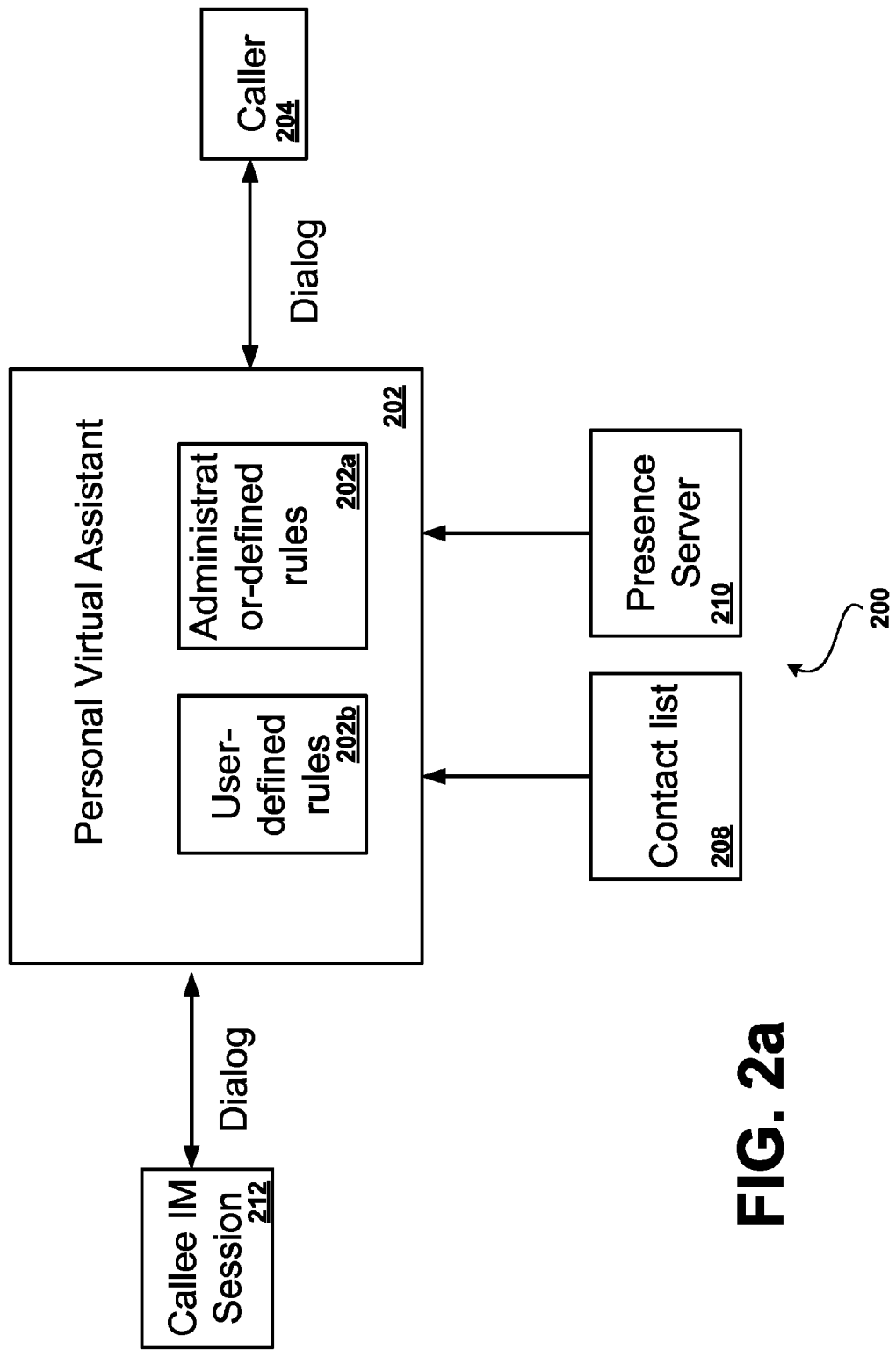
FIG. 2a is a block diagram of a system for cross-modal communication in accordance with some embodiments of the invention.
Figure 2B:
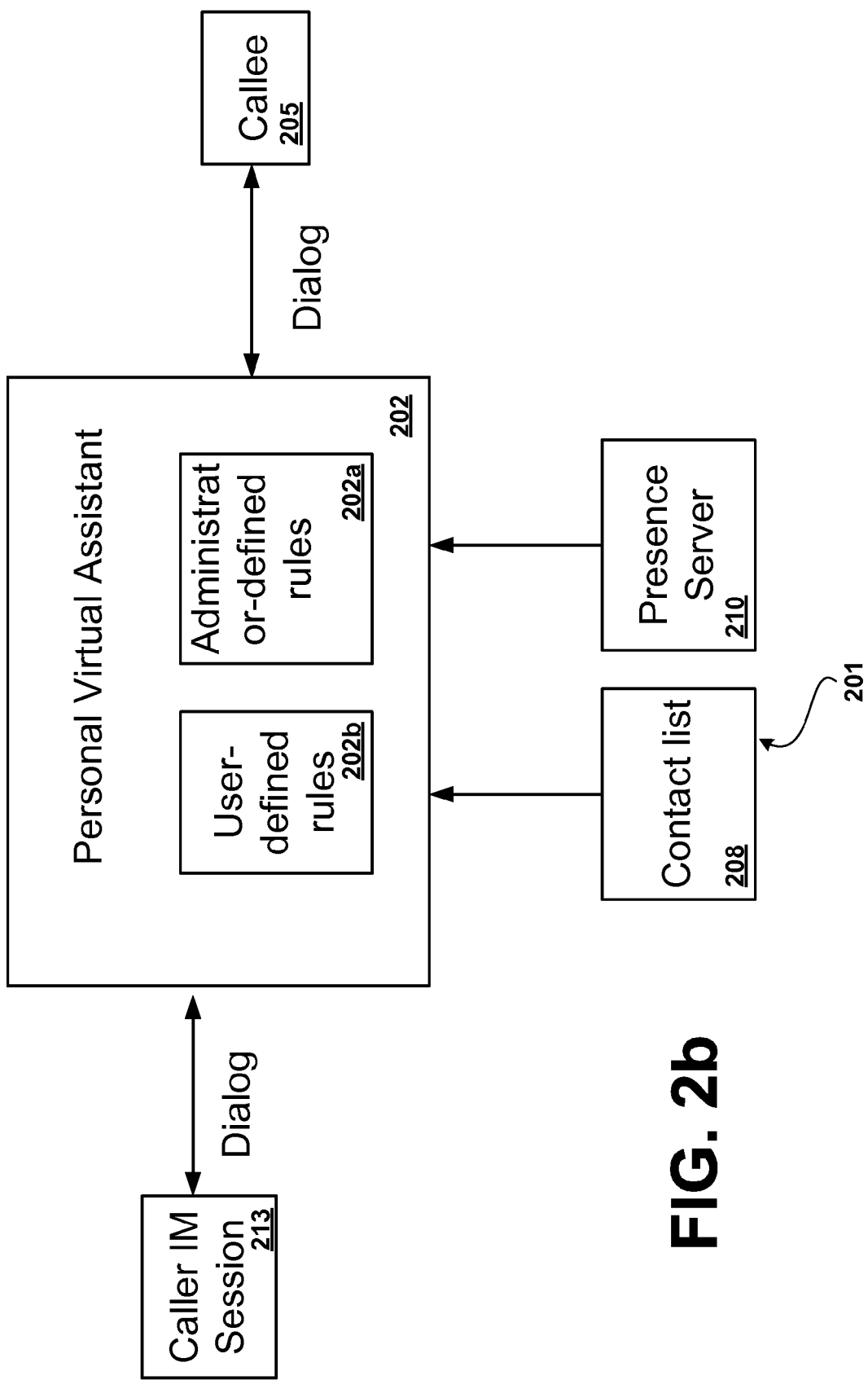
FIG. 2b is another block diagram of a system for cross-modal communication in accordance with embodiments of the invention.

FIG. 2a illustrates an exemplary system 200 for cross-modal communication in accordance with embodiments of the invention. System 200 may reside on one or more computers such as the one illustrated above with respect to FIG. 1. Personal Virtual Assistant (PVA) 202 may include one or more components including a (not shown) speech server comprising a conversational workflow engine including a language processing core and workflow-based APIs and a communication server such as Microsoft's Live Communication Server. A caller 204 may make a telephone call to a callee 212 (a PVA user) via any telephony communications device including a telephone, cellular telephone, PDA, smart phone, or any PC based soft-phone, and so on. Thus, caller 204 may represent any SIP (Session Initiation Protocol) telephony client including a communications server client such as a Microsoft Office Communicator client, a POTS telephone using VoIP gateways or any other telephone or communications device using the SIP protocol. Caller 204 may represent a PVA user, and thus the incoming call may be a call placed by another PVA. Alternatively, caller 204 may be a non-PVA user. Alternatively, the caller may be an interactive text messenger client as illustrated in FIG. 2b, caller 213 making a call to a telephone user callee 205. Call-handling graphical user interfaces may be provided to complement the voice interface and handle the text side of cross-modal interactions. Embodiments of the invention include one or more of the following areas of speech-enabled functionality: incoming call negotiation, call handling, voice mailbox access, voice dialing and PVA configuration. Incoming call negotiation may include one or more of the following: caller identification, call characterization, user alert and election and user election. PVA 202 may receive information such as contact information from a contact database 208 and rules including generalized rules 202a and user-specific rules 202b. For example, a PVA user such as callee 212 may specify rules concerning how all or some portion of incoming calls are to be handled (e.g., "If I do not answer my telephone by the fourth ring, transfer my call to my assistant, Kathleen." "If the caller identifies himself as "Sam", tell him not to call me any more and hang up!"). Rules may apply to all calls received by the callee, may apply to all calls of a particular type, may apply to all calls from a particular (specified) caller, may apply to all calls from a specified group of callers, and so on. Information about the whereabouts of the callee 212 may be provided by a presence server 210. Presence information can be obtained by information available from other applications running on the computer and may include information concerning whether the PVA user is logged onto his computer, whether or not the PVA is logged onto an interactive text messaging application, information available from a scheduling or calendar application While caller 204 may or may not be a PVA user, in FIG. 2a, callee 212 is a PVA user. In response to receiving caller 204's call to PVA user 212, a dialog with PVA 202 may be initiated by PVA 202. During phase one (the greeting phase) PVA 202 may greet the caller and (optionally) indicate that the PVA is an automated speech processor. Suppose, for example, that caller Larry calls PVA user Bill's desktop telephone by dialing Bill's telephone number. After a specified number of rings, the PVA may answer the call and greet the caller, e.g., PVA: "Hi, this is Bill's Virtual Assistant; please speak clearly."

PVA 202 may receive information from the IP network concerning the identity of the caller. For example, the ANI feature of the IP network may deliver the telephone number of the telephone Larry is using to PVA 202. The PVA 202 may examine Contact list 208 for the number received from the network. If the received number is found in the Contact list 208 and (optionally) is unique, the PVA 202 may attempt to confirm that the caller is the person associated with the number, e.g., PVA: "Is this Larry calling?" If this is Larry calling, he may confirm his identity, e.g., Larry: "Yes". Upon receiving voice input from caller 204, a speech recognition component of PVA 202 is activated. The dialog that collects the information from the caller may be open-ended where the speech recognizer attempts to make a best-guess at name, topic, etc. based on global grammars or it may implement categories for selection based on predefined menus such as PVA: "What is the topic? Please say 'work-related', 'non-work related' or 'confidential' enabling much simpler grammars to be used. The dialog may be enhanced by sharing the presence of the callee with the caller, if the callee's rules allow this information to be shared with the caller. In this case, an extra step may be added that tells the caller that the callee is [wherever the callee is] before continuing on. When the identity of the caller is established, processing continues to the next phase (negotiation). If the identity of the caller has not yet been established, PVA 202 may attempt to confirm identity. For example, suppose it is someone else, (perhaps using Larry's phone), the caller may identify himself, e.g., "No, this is Tal, on Larry's telephone." The PVA 202 may check for the received name (e.g., "Tal") in the Contact list 208. If the received name is found in the Contact list 208 and is unique, the PVA 202 may determine that identity has been confirmed and go on to the negotiation phase. The PVA 202 may determine that the received name is not unique and may reprompt for identity. If no match can be found in the Contact List 208, PVA 202 may conclude that the caller is unknown, record the non-Contact name and continue on to the negotiation phase. If no ANI information is available, PVA 202 may prompt for identity, (e.g., "May I ask who is calling?") and then follow the rest of the procedure described above. If during the above described process, the name is not recognized with a high degree of confidence, the PVA 202 may reprompt, e.g., PVA: "I did not understand you, please repeat your name?"

During the classification portion of the negotiation phase, the urgency of the call may be elicited from the caller. For example, the PVA 202 may ask "Is your call urgent?" and use the received information to classify the call to determine how to handle the call, as described more fully below. In some embodiments of the invention, members of the Contacts list 208 can be grouped (e.g., "Florence" is a member of the Family group, "Larry" is a member of the Supervisor group, etc.) and only some groups may be prompted for urgency information, based on user-specified rules.

During a user alert and election portion of the negotiation phase, the location or presence of the callee (PVA user) is determined. If the PVA user is at his desk, logged into his computer and not using the telephone when the call is received, PVA 202 may cause the telephone to ring, and display a popup message on the PVA user's computer screen. An example of a popup message may be, PVA: "[name of caller] is calling and he says it is urgent." PVA 202 may provide a list of options including but not limited to: PVA: "(1) Take Message, will reply in [N] minutes (2) Transfer to [name specified in user rules]. The PVA user in some embodiments of the invention has one or more of the following options: [Case 1] The callee picks up the telephone to talk to the caller. [Case 2] The callee enters a number (e.g., types '20') into the Take Message edit box and selects it. In response, PVA 202 may proceed to take a structured voicemail from the caller, and tells the caller that the callee will return his call within the callee-specified (in the example, within 20 minutes) reply time. [Case 3] The callee leaves the edit box empty, and selects the Take Message option. In response PVA 202 may proceed to take a structured voicemail, and does not specify a reply time to the caller. [Case 4] The callee selects Option 2 (Transfer call). In response, PVA 202 may proceed to the Call Transfer function, with destination being the destination specified by the callee.

If the PVA user is at his/her desk, on the telephone but not logged onto his computer, the PVA 202 may ring the telephone with a special ring denoting that there is a second incoming call (call waiting ring). The callee (PVA user) may put his first caller on hold. In response the PVA 202 may indicate to the callee that he has a call from the confirmed identity caller and indicate (if collected) the urgency classification of the call, e.g., PVA: "[name of caller] is calling and he says it is urgent." The callee may respond as described above. If the PVA user is not at his/her desk but is logged onto his computer, PVA 202 may display a popup on the callee's computer screen, such as "[name of caller] is calling and he says it is urgent. Should I (1) Forward his call to your mobile (2) Take a message and tell him you will call back in [N] minutes (3) Transfer the call to [person specified by PVA user]?" [Case 1] If the callee selects option 1, PVA 202 may proceed to Forward Call processing. In response to this selection, PVA 202 may forward the call to the PVA user's mobile telephone. [Case 2] The callee selects Option 2 or 3. In response to these selections, PVA 202 may proceed to take a structured voicemail or perform Call Transfer processing, respectively. If the PVA user is not at his/her desk, is not logged onto his computer and receives an urgent call, the PVA 202 may discover via presence processing that the callee cannot be alerted via the PVA, and may proceed to the Caller Election phase.

If the caller is limited to leaving a structured voicemail by the user-specified rules, the PVA 202 may tell the caller that the callee is not at his desk, and that the caller can leave a message, e.g., PVA: "I'm sorry, but [callee name] is not at his desk, so I'll take a message for him, and he will get back to you as soon as he can." If the caller is permitted by the user-specified rules to elect to forward a call, the PVA 202 can indicate to the caller that his call can either be forwarded to the callee's mobile communications device or he can be sent an alert, e.g., PVA: "I'm sorry, [name of caller], but [name of callee] is not at his desk. Would you like me to forward your call to his mobile, or take a message here and send him an alert?" [Case 1] If the caller opts to leave a message, the caller may say so and PVA may proceed to structured voicemail handling. [Case 2] If the caller opts to forward the call, the caller may say so: e.g., Caller: "Please forward the call." and PVA may proceed to forward the call to callee's mobile number.

PVA 202 may also dispose of a call by transferring the call. PVA 202 may transfer a call to a single number or may dispose of the call by selecting from a list of numbers to which to transfer the call. Suppose for example, that the PVA user (the callee) will be out of the office for some period of time and wants the PVA to dispose of the call based on the subject matter of the incoming call. When a call comes in to the callee's number, PVA 202 may play a prompt recorded by the PVA user for this purpose, e.g., Bill: "I'm out of the office until June 15. For schedule questions, contact Ray. For beta questions, speak with Alex. For M4 questions, talk to Chris. For all other issues, please ask to speak with Kathleen, or leave a message which I will get when I return. How shall I direct your call?" PVA 202 may process the caller's reply and transfer the call based on the recognized name or key word in the caller's response; e.g., Larry: "Oh, um, put me through to Ray." In response to detecting the word "Ray" PVA may respond with a message such as PVA: "Please wait while I transfer your call to Ray." The person to whom the message is transferred may be a PVA user, and thus the call transferred to "Ray" may itself be handled by a PVA. PVA: "Larry, please wait while I establish an IVM session with Bill . . . OK, please speak your message clearly."

FIG. 2b illustrates an exemplary system 201 for cross-modal communication in accordance with embodiments of the invention. System 201 may reside on one or more computers such as the one illustrated above with respect to FIG. 1. Personal Virtual Assistant (PVA) 202 may include one or more components including a (not shown) speech server comprising a conversational workflow engine including a language processing core and workflow-based APIs and a communication server such as Microsoft's Live Communication Server. A caller 213 (a PVA user) may make a telephone call to a callee 205 via an interactive text messaging client connected to a VoIM gateway as described above. Thus, callee 205 may represent any SIP (Session Initiation Protocol) telephony client including a communications server client such as a Microsoft Office Communicator client, a POTS telephone using VoIP gateways or any other telephone or communications device using the SIP protocol. Callee 205 may represent a PVA user, and thus the incoming call may be a call placed by another PVA. Alternatively, callee 205 may be a non-PVA user. Call-handling graphical user interfaces may be provided to complement the voice interface and handle the text side of cross-modal interactions. Embodiments of the invention include one or more of the following areas of speech-enabled functionality: incoming call negotiation, call handling, voice mailbox access, voice dialing and PVA configuration. Incoming call negotiation may include one or more of the following: caller identification, call characterization, user alert and election and user election. PVA 202 may receive information such as contact information from a contact database 208 and rules including generalized rules 202a and user-specific rules 202b. For example, a PVA user such as callee 205 may specify rules concerning how all or some portion of incoming calls are to be handled (e.g., "If I do not answer my telephone by the fourth ring, transfer my call to my assistant, Kathleen." "If the caller identifies himself as "Sam", tell him not to call me any more and hang up!"). Rules may apply to all calls received by the callee, may apply to all calls of a particular type, may apply to all calls from a particular (specified) caller, may apply to all calls from a specified group of callers, and so on. Information about the whereabouts of the callee 212 may be provided by a presence server 210. Presence information can be obtained by information available from other applications running on the computer and may include information concerning whether the PVA user is logged onto his computer, whether or not the PVA is logged onto an interactive text messaging application, information available from a scheduling or calendar application Thus, while callee 205 may or may not be a PVA user, in FIG. 2b, caller 213 is a PVA user. In response to receiving caller 213's call to callee 205, a dialog with PVA 202 may be initiated by PVA 202.

Figure 3:
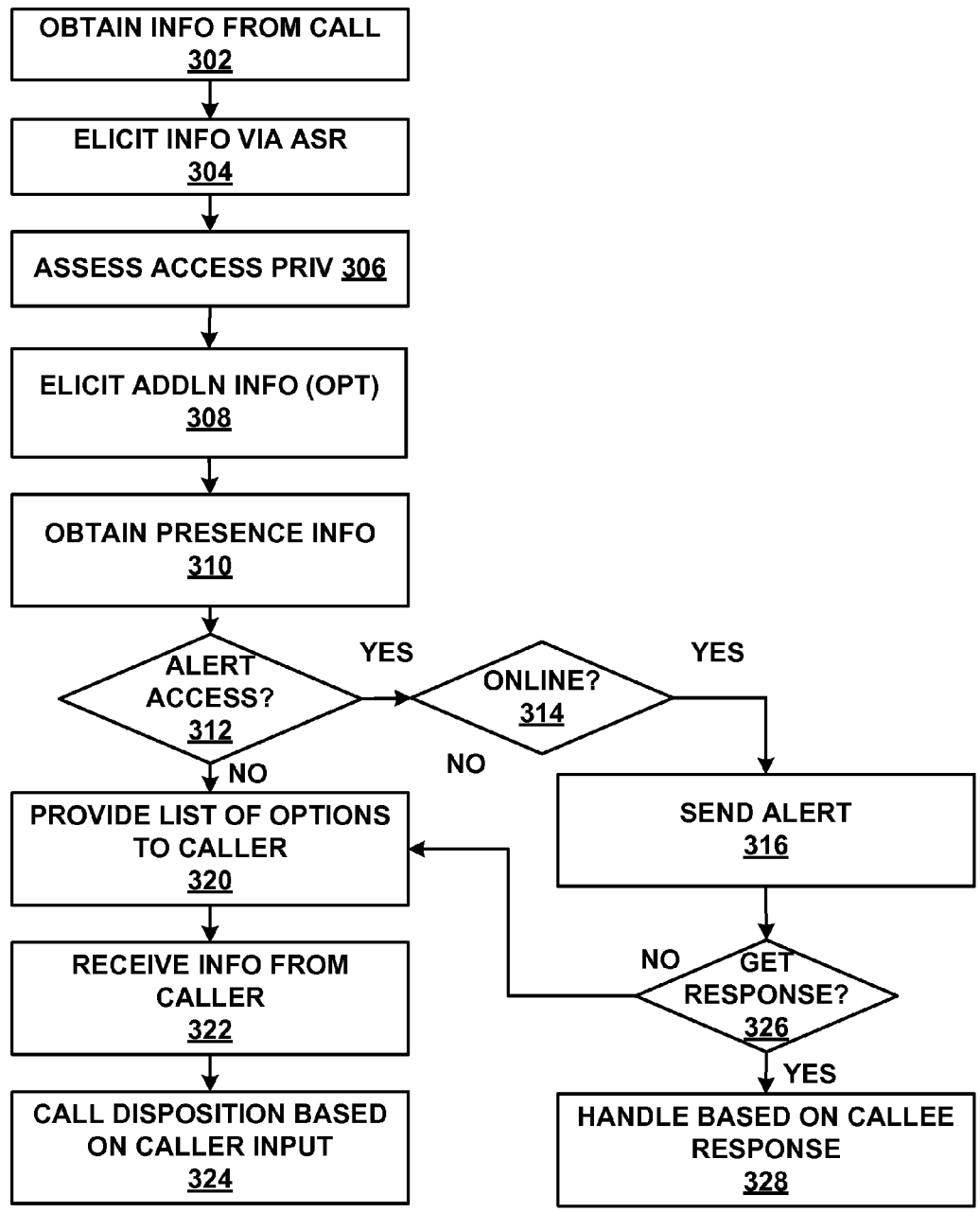
FIG. 3-5 are flow diagrams of methods for cross-modal communication in accordance with some embodiments of the invention.

FIG. 3 is an exemplary flow diagram of a method for cross-modal communication in accordance with embodiments of the invention. At 302 caller information is received. Caller information may include information such as ANI information, DNIS (dialed number identification service) information, SIP invite address or other information. At 304 additional information may be elicited from the caller using automated speech recognition processing. If the information received at 302 and 304 is sufficient, this information may be used to look up the rules-defined access privileges for the caller (306). In some embodiments of the invention, the caller telephone number is looked up in the contact list. The contact list may include caller telephone number, caller name, the group (e.g., Family, Supervisor, Customer, etc.) to which the caller belongs. Based on belonging to a particular group, special rules (from rules database 210) may be applied. At 308, based on the access privileges, additional information may be requested from the caller. For example, if the caller belongs to a Family group, the caller may be prompted for call classification information such as urgency of the call. Rules in the rules database may be based on this classification. For example, an urgent call from a Family member may receive some kind of preferential treatment, as specified in the rules for this type of call from this type of caller. At 310, callee presence information is obtained. Presence information can be obtained by information concerning whether the PVA user is logged onto his computer, whether or not the PVA is logged onto an interactive text messaging application, information available from a scheduling or calendar application. At 312 it is determined if the callee has access to user alert. If the callee does have access to user alert and the callee is on-line (314), an alert is sent (316). If callee input is received specifying the call disposition desired (326), the call is handled according to the callee input (328). If no callee input is received after a specifiable time period or the callee does not have access to user alert, at 320, the caller is provided with a list of whatever choices are enabled by the access privileges of the caller. These may include forward call, voicemail, transfer to another number, instant voice messenger and so on as described above. The caller's choice is obtained using automated speech recognition (322). At 324 if the option chosen is to initiate an instant messaging session with the callee, cross-modal communication as described below is initiated.

Figure 4:
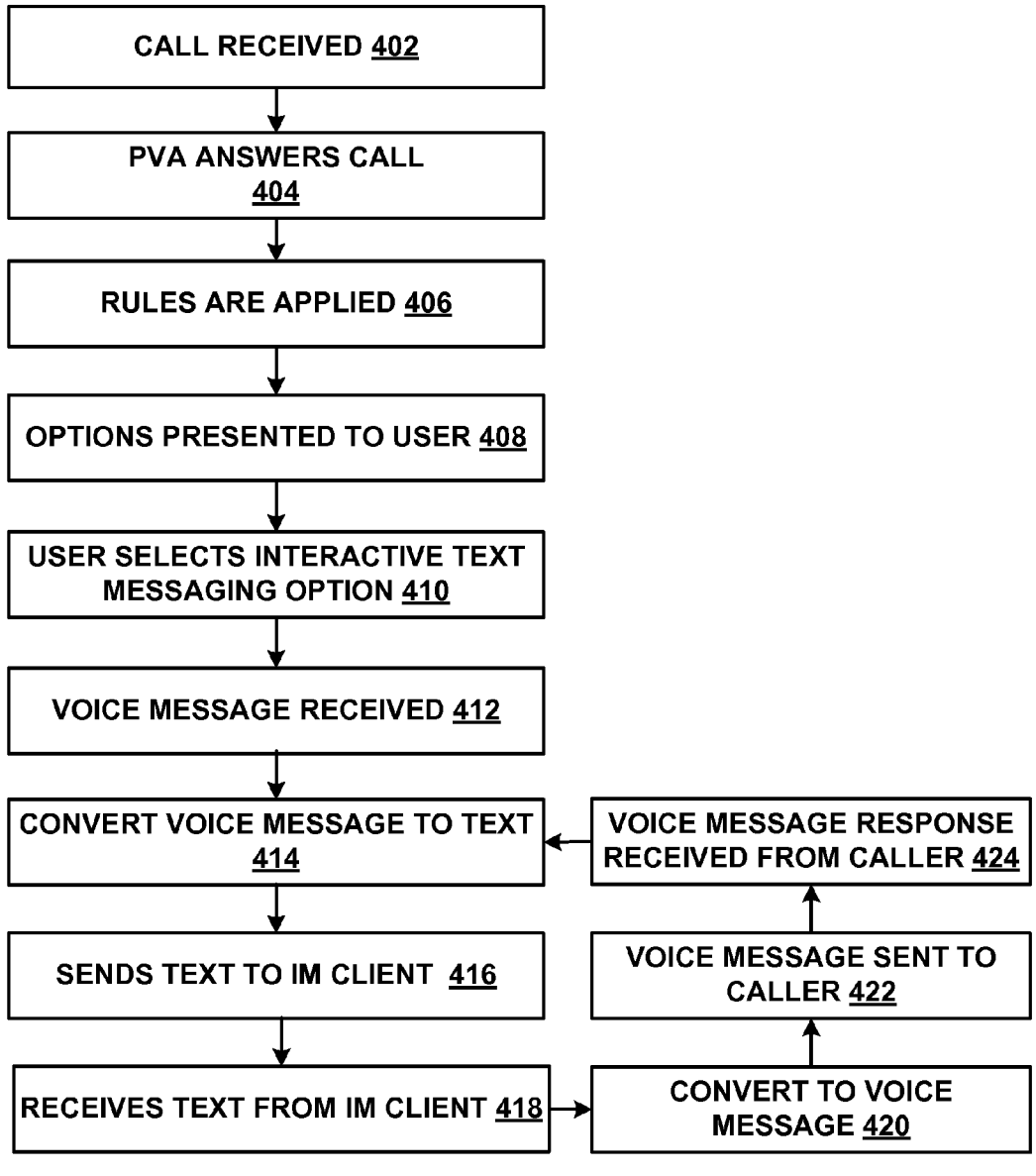

FIG. 4 is a method for cross-modal communication when the caller is a voice-device user in accordance with embodiments of the invention. At 402 the call is received by the PVA. At 404, the PVA answers the call and receives whatever information is available for the call as described above. At 406 the available information is processed according to PVA user-configurable rules. Assuming that enough information is available to make a final call disposition, that disposition is enacted. If there is not enough information to make a call disposition decision, the source and nature of the next information to obtain is determined. At 408 the options available are presented to the caller. At 410, in response to receiving a user selection of initiating an interactive text messaging session with the callee, the PVA initiates an interactive text messaging session. At 412, the PVA may prompt the caller for a message for the callee. Upon receiving the voice message, the PVA may convert the voice message to text at 414, send the text message to the IM client (the callee) at 416, receive a text answer from the callee at 418, convert the text answer to voice at 420, send the voice message to the caller at 422, receive the voice message response from the caller at 424 and continue processing at 414 until the cross-modal conversation terminates.

Figure 5:
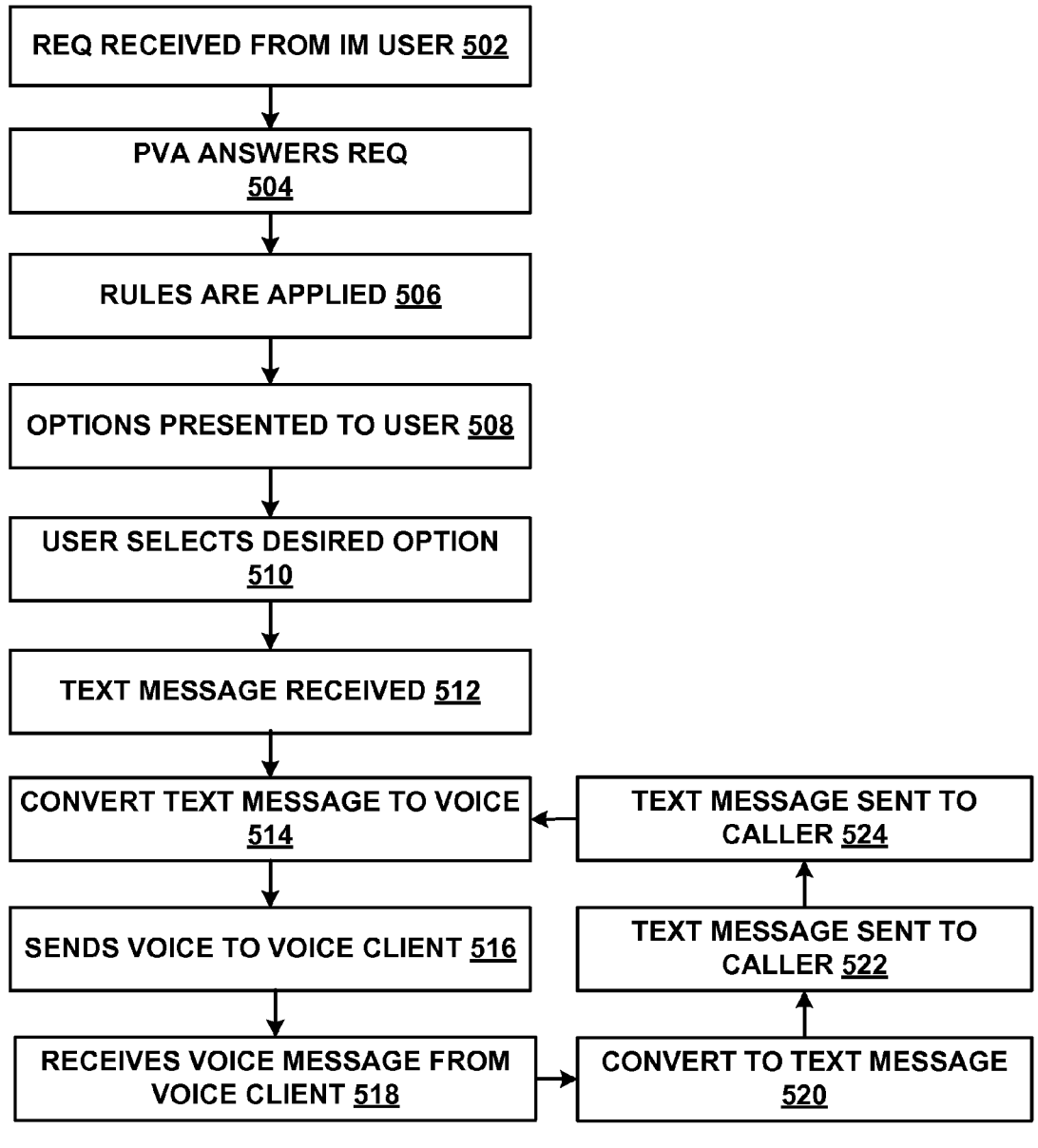

FIG. 5 is a method for cross-modal communication when the caller is an interactive text-messaging client in accordance with embodiments of the invention. At 502 the PVA receives a request to make a cross-modal call from a an interactive text-messaging client who is a PVA user. At 504, the PVA receives the request including whatever information is available for the call as described above. At 506 the available information is processed according to PVA user-configurable rules. Assuming that enough information is available to make a final call disposition, that disposition is enacted. If there is not enough information to make a call disposition decision, the source and nature of the next information to obtain is determined. At 508 the options available are presented to the caller. At 510, in response to receiving a user selection of one of the options, the PVA initiates a telephony call. At 512, the PVA may prompt the caller for a message for the callee. Upon receiving the text message, the PVA may convert the text message to voice at 514, send the voice message to the telephony client (the callee) at 516, receive a voice answer from the callee at 518, convert the voice answer to text at 520, send the text message to the caller at 522, receive the text message response from the caller at 524 and continue processing at 514 until the cross-modal conversation terminates.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A system for cross-modal communication comprising:
a processing means comprising a processor; and
a single platform for cross-modal communication between a first device of a first mode and a second device of a second mode different than the first mode,
the single platform for cross-modal communication capable of being configured to convert a first message in the first mode sent from the first device to the second mode to be received on the second device in the second mode, and capable of being configured to convert a second message in the second mode sent from the second device to the first mode to be received on the first device in the first mode,
the single platform for cross-modal communication capable of being configured to collect information relating to a grouping and an identifier of at least one of the first message and the second message and classifying at least one of the first message and the second message based on the collected information relating to the grouping and the identifier.

2. The system of claim 1, wherein the first mode is voice.

3. The system of claim 2, wherein the second mode is text.

4. The system of claim 1, wherein the first mode is text.

5. The system of claim 4, wherein the second mode is voice.

6. The system of claim 1, wherein the first device is a desktop telephone, cellular telephone, PDA, smart phone, or a PC based soft-phone.

7. The system of claim 1, wherein the second device is an interactive text messaging client.

8. The system of claim 1, wherein the cross-modal communication occurs in real-time.

9. A method for cross-modal communication comprising:
receiving a request for cross-modal communication between a first device of a first mode and a second device of a second mode;
collecting information relating to a grouping and an identifier of the request and classifying the request based on the collected information relating to the grouping and the identifier of the request; and
establishing a communication session between the first device and the second device, wherein a first message sent from the first device to the second device is converted from a first mode to a second mode and wherein a second message sent from the second device to the first device is converted from the second mode to the first mode.

10. The method of claim 9, wherein the first mode is voice and the second mode is text.

11. The method of claim 9, wherein the first mode is text and the second mode is voice.

12. The method of claim 9, wherein a user of the first device is a caller and a user of the second device is a callee.

13. The method of claim 12, wherein the communication session is established according to a set of rules associated with the caller.

14. The method of claim 12, wherein the communication session is established according to a set of rules associated with the callee.

15. The method of claim 9, wherein the communication session is conducted in real-time.

16. A computer-readable storage medium that is not a signal and that comprises computer-executable instructions that when executed cause a computing environment to:
receive a request for cross-modal communication between a first device of a first mode and a second device of a second mode;
collect information relating to a grouping and an identifier of the request and classifying the request based on the collected information relating to the grouping and the identifier of the request; and
establish a communication session between the first device and the second device, wherein a first message sent from the first device to the second device is converted from a first mode to a second mode and wherein a second message sent from the second device to the first device is converted from the second mode to the first mode.

17. The computer-readable storage medium of claim 16, comprising additional computer-executable instructions that when executed cause the computing environment to:
converting a voice message to text, wherein the first mode is voice and the second mode is text.

18. The computer-readable storage medium of claim 16, comprising additional computer-executable instructions that when executed cause the computing environment to:
convert a text message to voice, wherein the first mode is voice and the second mode is text.

19. The computer-readable storage medium of claim 16, comprising additional computer-executable instructions that when executed cause the computing environment to:
send the converted message to the second device.

20. The computer-readable storage medium of claim 16, comprising additional computer-executable instructions that when executed cause the computing environment to:
conduct the communication session in real-time.

* * * * *